United States Patent [19]

Ninomiya et al.

[11] Patent Number: 4,809,178
[45] Date of Patent: Feb. 28, 1989

[54] OBSTACLE DATA PROCESSING SYSTEM FOR UNMANNED VEHICLE

[75] Inventors: Yoshiki Ninomiya, Nagoya; Gunji Sugimoto, Kariya; Takero Hongo, Nagoya; Keiichi Watanabe, Aichi; Hideo Arakawa, Nagoya, all of Japan

[73] Assignee: Kabushiki Kaisha Toyota Chuo Kenkyusho, Aichi, Japan

[21] Appl. No.: 51,831

[22] Filed: May 20, 1987

[30] Foreign Application Priority Data

May 22, 1986 [JP] Japan .................................. 61-118296
May 22, 1986 [JP] Japan .................................. 61-118295

[51] Int. Cl.$^4$ .............................................. G05D 1/02
[52] U.S. Cl. ..................................... 364/443; 318/587; 364/461
[58] Field of Search ............... 364/424, 443, 460, 461; 318/580, 587; 180/167, 168, 169; 901/1, 49; 367/909

[56] References Cited

U.S. PATENT DOCUMENTS

| | | | |
|---|---|---|---|
| 4,379,490 | 4/1983 | Hainsworth et al. | 318/587 X |
| 4,531,123 | 7/1985 | Tagami et al. | 364/460 X |
| 4,600,999 | 7/1986 | Ito et al. | 318/587 X |
| 4,630,065 | 12/1986 | Ichikawa | 364/460 X |
| 4,674,048 | 6/1987 | Okumura | 318/587 X |

FOREIGN PATENT DOCUMENTS

| | | | |
|---|---|---|---|
| 58-107910 | 6/1983 | Japan | 318/587 |
| 59-11409 | 1/1984 | Japan | 318/587 |
| 59-16018 | 1/1984 | Japan | 180/169 |
| 61-134812 | 6/1986 | Japan | 318/587 |

Primary Examiner—Bentsu Ro
Attorney, Agent, or Firm—Oblon, Fisher, Spivak, McClelland & Maier

[57] ABSTRACT

An obstacle data processing system for an unmanned self-controlled vehicle, capable of enabling the vehicle to automatically avert any obstacle which lies in the course of running of the vehicle. The system has obstacle position memory device capable of accumulating position data concerning specific obstacles and, hence, forming data concerning the distribution of the obstacles. The vehicle therefore can conduct appropriate averting operation in accordance with the distribution of a plurality of obstacles.

8 Claims, 8 Drawing Sheets

| 5A | 5B | SENSING AREA | STEERING AMOUNT |
|---|---|---|---|
| O | X | A3 | $\theta_1$ |
| O | O | A2 | $\theta_2$ |
| X | O | A1 | $\theta_3$ |
| X | X | — | — |

O --- OBSTACLE EXISTS
X --- NO OBSTACLE EXISTS

OBSTACLE DATA PROCESSING SYSTEM FOR UNMANNED VEHICLE

BACKGROUND OF THE INVENTION

1. Field of the Invention

The present invention relates to an obstacle data processing system for an unmanned vehicle, adapted for processing data concerning obstacles which may lie in the path of a self-controlled unmanned vehicle so as to enable the vehicle to avert such obstacles.

2. Description of the Related Art

Hitherto, an obstacle data processing system has been known in which non-contact type obstacle sensors are mounted on left and right portions of the front of the vehicle so as to roughly calculate the positions of an obstacle on the basis of the distance between the obstacle and the object as measured by such sensors, and the unmanned vehicle is automatically steered in accordance with the thus calculated position of the obstacle so as to avert the obstacles. An example of such a data processing system is disclosed, for example, in Japanese Patent Laid-Open No. 74905/1984.

FIG. 1 shows a lawn mower as an example of such a self-controlled unmanned vehicle. The vehicle has a chasis DI provided with supersonic sensors 5A and 5B on the front thereof. Both sensors 5A and 5B have an identical construction and are adapted to intermittently transmit supersonic waves to cover predetermined regions and to receive waves reflected by any obstacle A which may lie ahead of the vehicle. The processing system then processes the time between the moment at which the supersonic wave is transmitted and the moment at which the reflected wave is received so as to determine the distance between the obstacle A and the vehicle. The arrangement is such that the areas $X_1$ and $X_2$ covered by both sensors 5A and 5B partially overlap each other so that the processing system can determine in which One of three regions $A_1$, $A_2$ and $A_3$ the obstacle exists. FIG. 2 shows a Table showing the relationship between the states of outputs from the sensors 5A and 5B and the position of the obstacle. When the obstacle is sensed by the sensor 5A alone, the processing system judges that the obstacle is on the right side of the vehicle ahead of the same, i.e., in the region $A_3$, whereas, when the obstacle is sensed by the sensor 5B alone, the system judges that the obstacle is in the left side of the vehicle ahead of the same, i.e., in the region $A_1$. Thus, when the obstacle is detected by both sensors 5A and 5B simultaneously, the processing system judges that the obstacle resides right ahead of the vehicle.

The processing system then determines only on the basis of such obstacle position data, the angle $\theta_1$, $\theta_2$ and $\theta_3$, as shown in Table in FIG. 2.

In another known system, the obstacle is detected through scanning by a TV camera or a supersonic range finder having a narrow directivity so as to precisely determine the position of the obstacle three-dimensionally. In some advanced systems, data concerning complicated configuration of the obstacle is extracted in order to recognize or identify the object.

The system proposed in the above-mentioned Japanese Patent Laid-Open No. 74905/1984, however, suffers from the following disadvantage. Namely, the data concerning the position of the obstacle is utilized only in the control of simple averting action such as stopping or simple steering operation each time an obstacle is detected. Namely, there is no means for storing and accumulating such position data in such a manner as to grasp the distribution of many obstacles nor for utilizing the data concerning such a distribution in averting the obstacles. In addition, the accuracy of finding of the position is not so high so that repetition of simple try-and-error is necessary each time an obstacle is detected.

Other known systems mentioned above necessitate large-scale apparatus because they employ a TV camera or a scanning supersonic range finder of narrow directivity not only for the purpose of detecting an obstacle but also for conducting various operations such as extraction of three-dimensional dimensional position of the obstacle, recognition of the complicated configuration of the obstacle and the identification of the obstacle. In addition, these operations are generally time-consuming and the data acquired through such operations may include data which are not directly utilized in the averting action.

Thus, the conventional obstacle position data processing system does not incorporate any function which would grasp the pattern of distribution of many obstacles through accumulation of the obstacle position data, so that the vehicle can conduct only a simple averting operation such as stopping or a predetermined steering. In addition, in some known systems, the data processing is impractically low because the acquired data contain those data which are not directly utilized in the averting operation.

Under these circumstances, the present inventors have made an intense study and found that, though the position data obtained each time an obstacle is detected is limited, an accumulation of such obstacle position data can form a data concerning distribution of a plurality of obstacles which is necessary and enough for enabling the vehicle to avert such obstacles, whereby major problems of the prior art are overcome.

SUMMARY OF THE INVENTION

Accordingly, an object of the present invention is to provide a practical and simple obstacle data processing system for an unmanned vehicle, capable of accumulating plurality of obstacle position data acquired by obstacle sensing means so as to form data concerning distribution of a plurality of obstacles necessary and enough for enabling an unmanned vehicle to avert such obstacles, thus allowing the vehicle to adapt to the situation, thereby overcoming the above-described problems of the prior art.

Another object of the present invention is to provide an averting operation command system for an unmanned vehicle, the system being capable of operating at a practical processing speed and flexibly adapting to a variety of patterns of distribution of obstacles, by virtue of a cooperation between an obstacle sensing means for sensing any obstacle, an obstacle significance judging means for judging necessity for averting operation through determination of the distance between the obstacle and the course of the vehicle, and averting operation determining means for realizing the averting operation through computation of the distance between the obstacle and the position of the vehicle at which the vehicle is expected to commence its averting operation.

To this end, according to one aspect of the present invention, there is provided an obstacle data processing system for a self-controlled unmanned vehicle which has, as shown in FIG. 3, a position and heading measuring means 1 for measuring the position and heading of the unmanned vehicle and a running course memory means 2 storing position data concerning the position of the vehicle along the course so as to enable the vehicle to run along the course while averting any obstacle in the course. The system of this aspect of the invention has the following features: obstacle detecting means 3 for detecting an obstacle and adapted for outputting position data concerning the position of the obstacle in terms of coordinate values on a coordinate system fixed to the vehicle; absolute position computing means 4 for converting, in accordance with the position and heading measured by the position and heading measuring means 1 at the time when the obstacle is detected, the position data derived from the obstacle detecting means 3 into absolute position data in terms of coordinate values on an absolute coordinate system which is assumed on the place where the vehicle runs and which constitutes the reference for the control of running of the vehicle; obstacle position memory means 5 for storing the position data concerning specific obstacles which have been detected, whose coordinate values are converted into the absolute coordinate values, which is judged that their coordinate values should be stored and which is outputted; comparison means 6 for comparing position of an obstacle which has been converted by absolute position computing means 4 with the positions of the specific obstacles the position data of which have been stored in the obstacle memory means 5; and storage obstacle position computing means 7 for judging, in accordance with the result of the comparison performed by the comparison means 6, the position data of a specific obstacle to be stored in the obstacle memory means 5 and for outputting this position data, on the basis of the position data of the specific obstacles stored in the obstacle position storing means 5 or the obstacle position data converted by the absolute position computing means 4.

In this aspect of the present invention, referring to FIG. 3, the obstacle detecting means 3 is adapted to detect any obstacle and to output obstacle position data. The obstacle position data is expressed in terms of coordinate values on a coordinate system which is fixed to the body of the unmanned vehicle. The coordinate system therefore varies depending on the instant position and heading of the vehicle, so that a difficulty arises from attaining the correlation between the coordinate values of obstacles detected at different positions of the vehicle. This in turn requires coordinate values of the obstacle obtained on different coordinate systems to be converted into coordinate value on a common coordinate system. It is the most efficient way to utilize, as the common coordinate, a common absolute coordinate system which is assumed on the land on which the vehicle runs and which is used as the reference in the measurement of the position and heading of the vehicle output from the position and heading measuring means 1. The absolute position computing means 4 conducts a process for converting the coordinate position of the detected obstacle into coordinate position on this common coordinate system.

The obstacle position memory means 5 accumulates position data computed by the absolute position computing means 4 and output from the obstacle position computing means 7 after comparison by the comparing means 6.

The comparison means 6 operates to determine the position of the newly detected obstacle on the basis of the coordinate value calculated by the absolute position computing means 4 with respect to a specific obstacle the position of which has been stored beforehand in the obstacle position memory means 5.

The obstacle position computing means 7 has a function for computing, in accordance with the result of the comparison performed by the comparison means 6, the data concerning the position of the specific obstacle to be stored in the obstacle position memory means 5, on the basis of the position data concerning the specific obstacle stored in the obstacle position memory means 5 or the obstacle position data output from the absolute position computing means. Data concerning the distribution of positions of obstacles is progressively formed for greater number of obstacles and wider area of running, each time the data concerning new obstacle is added to the obstacle position memory device 5. It will be understood that the data concerning the distribution of obstacles accumulated in the obstacle memory device 5 enables the unmanned vehicle to have a more efficient averting operation with a wider adaptability than those in the case where the averting operation is conducted upon each detection of an obstacle.

The above and other objects, features and advantages of the present invention will become clear from the following description of the preferred embodiments when the same is read in conjunction with the accompanying drawings.

DESCRIPTION OF THE PREFERRED EMBODIMENTS

Figures 1, 2:
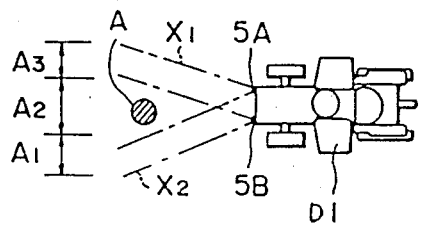
FIGS. 1 and 2 are illustrations of a conventional art.
Figure 3:
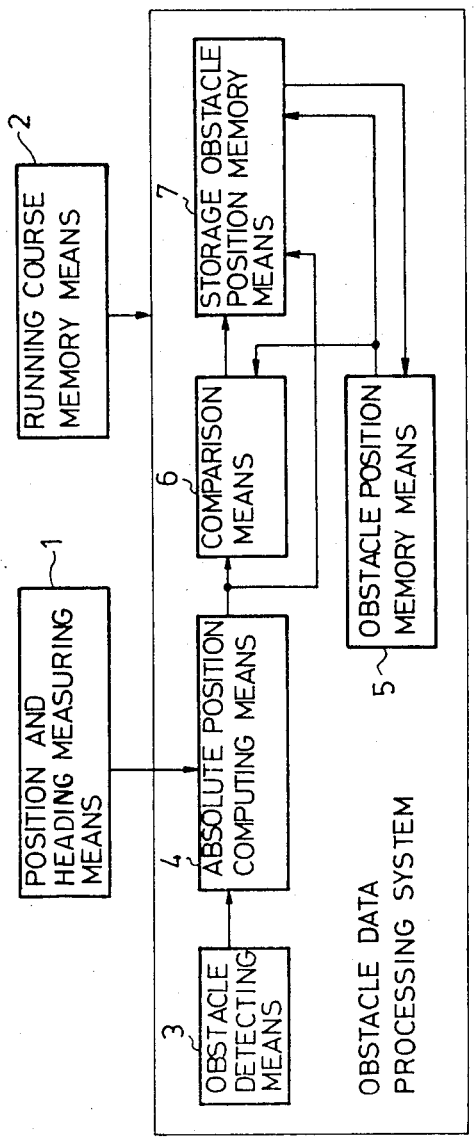
FIG. 3 is a schematic illustration of the concept of the present invention.
Figure 4:
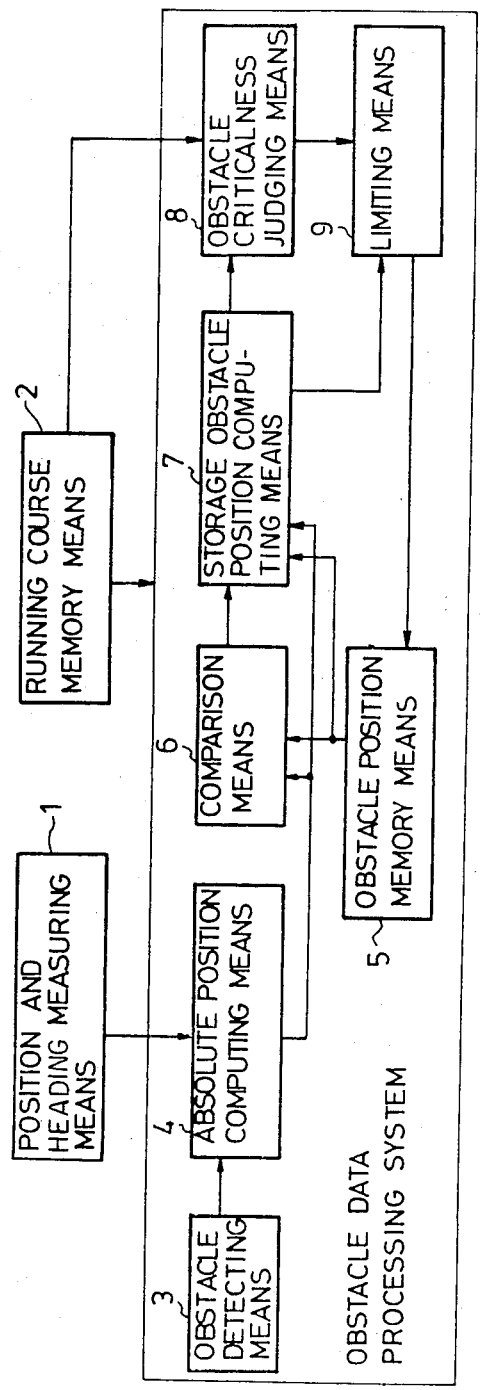
FIG. 4 is a schematic illustration of a first mode of the present invention.

FIG. 4 illustrates an obstacle data processing system in accordance with the first mode of the invention. As will be seen from this Figure, the first mode of the present invention provides an obstacle data processing system for a self-controlled unmanned vehicle which has a position and heading measuring means 1 for measuring the position and heading of the unmanned vehicle and a running course memory means 2 storing position data concerning the position of the vehicle along the course so as to enable the vehicle to run along the course. The system of this aspect of the invention has the following components: obstacle detecting means 3 for detecting an obstacle and adapted for outputting position data concerning the position of the obstacle in terms of coordinate values on a coordinate system fixed to the vehicle; absolute position computing means 4 for converting, in accordance with the position and heading measured by the position and heading measuring means 1 at the time when the obstacle is detected, the position data derived from the obstacle detecting means 3 into absolute position data in terms of coordinate values on an absolute coordinate system which is assumed on the place where the vehicle runs and which constitutes the reference for the control of running of the vehicle; obstacle position memory means 5 for storing the position data concerning specific obstacles which have been detected, whose coordinate values are converted into the absolute coordinate values, which is judged that their coordinate values should be stored and which is outputted; comparison means 6 for comparing the position of an obstacle which has been converted by absolute position computing means 4 with the positions of the specific obstacles the position data of which have been stored in the obstacle memory means 5; storage obstacle position computing means 7 for judging, in accordance with the result of the comparison performed by the comparison means 6, the position data of a specific obstacle to be stored in the obstacle memory means 5 and for outputting this position data, on the basis of the position data of the specific obstacles stored in the obstacle position storing means 5 or the obstacle position data converted by the absolute position computing means 4; obstacle criticalness judging means 8 for determining, when the position data concerning the specific obstacle to be stored is output from the storage obstacle position computing means 7, the distance between the position data of the specific obstacle and the position data along the course stored in the course memory means 2 and for comparing the determined distance with a predetermined threshold value which is used as the basis for judgment of the closeness of the obstacle to the course, the obstacle criticalness judging means being adapted for deciding, when the distance is smaller than the threshold value, that the obstacle should be averted, whereas, when the distance is greater than the threshold value, the obstacle criticalness judging means judges that there is no need for the vehicle to conduct any averting operation; and limiting means 9 for limiting the storage of the obstacle position data in the obstacle position memory means 5 when the obstacle criticalness judging means 8 has judged that there is no need for the vehicle to conduct any operation to avert the obstacle.

The operation of the obstacle data processing system in accordance with the first mode will be explained hereinunder with reference to FIG. 4. As will be seen from this Figure, the obstacle data processing system in accordance with the present invention has, in addition to the constituents of the aforementioned aspect of the invention, the obstacle criticalness judging means 8 and the limiting means 9. The obstacle criticalness judging means 8 is adapted for computing, when an obstacle position data concerning the position of an obstacle formed by the storage obstacle position computing means 7 is to be stored in the obstacle position memory means 5, the distance of the position of the object from the running course stored in the running course storage means 5. The obstacle criticalness judging means 8 further judges, on the basis of the computed distance, whether the position of the obstacle will cause said vehicle to collide with said obstacle. The limiting means 9 operates in accordance with the the result of the judgment conducted by the obstacle criticalness judging means 8 in such a manner as to limit the storage of the obstacle position data when the obstacle criticalness judging means has judged that there is no possibility for the vehicle to collide with the obstacle and, hence, there is no need for the vehicle to conduct averting operation.

With this arrangement, it is possible to avoid storage of unnecessary data in the obstacle memory means 5. This in turn permits a reduction in the number of the words to be stored in the memory means 5 and, hence, to reduce the number of steps of the data processing. The judgment concerning the criticalness of the obstacle is necessary also for the purpose of determining whether the averting operation is necessary and is utilized also for this purpose.

Thus, the obstacle data processing system in accordance with the first mode of the invention offers advantages in that the size of the whole system is reduced and the processing time is shortened because the obstacle position data is stored only when the averting operation is necessary, i.e., because unnecessary data is not stored in the memory.

Figure 5:
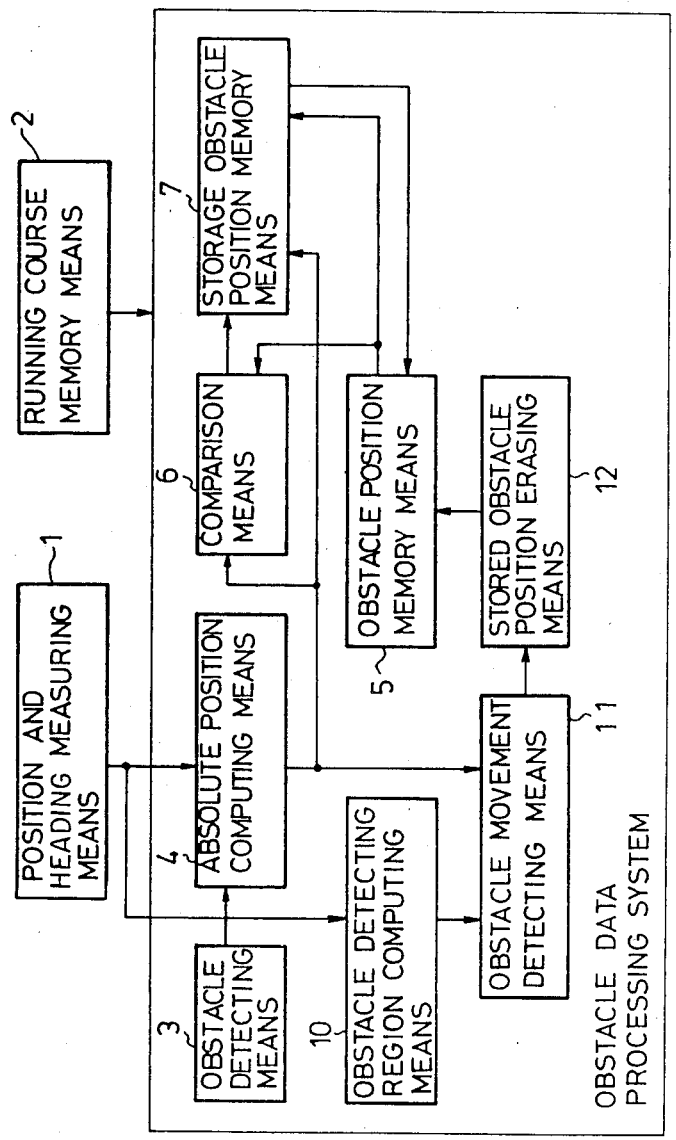
FIG. 5 is a schematic illustration of a second mode of the present invention.

An obstacle data processing system for an unmanned vehicle in accordance with the second mode of the present invention will be described hereinunder, with specific reference to FIG. 5. As will be seen from this Figure, the obstacle data processing system in accordance with the second mode of the present invention has a position and heading measuring means 1 for measuring the position and heading of the unmanned vehicle and a running course memory means 2 storing position data concerning the position of the vehicle along the course so as to enable the vehicle to run along the course while averting any obstacle in the course. The system of this mode of the invention has the following components: obstacle detecting means 3 for detecting an obstacle and adapted for outputting position data concerning the position of the obstacle in terms of coordinate values on a coordinate system fixed to the vehicle; absolute position computing means 4 for converting, in accordance with the position and heading measured by the position and heading measuring means 1 at the time when the obstacle is detected, the position data derived from the obstacle detecting means 3 into absolute position data in terms of coordinate values on an absolute coordinate system which is assumed on the place where the vehicle runs and which constitutes the reference for the control of running of the vehicle; obstacle position memory means 5 for storing the position data concerning specific obstacles which have been detected, whose coordinate values are converted into the absolute coordinate values, which is judged that their coordinate values should be stored and which is outputted; comparison means 6 for comparing position of an obstacle which has been converted by absolute position computing means 4 with the positions of the specific obstacles the position data of which have been stored in the obstacle memory means 5; storage obstacle position computing means 7 for judging, in accordance with the result of the comparison performed by the comparison means 6, the position data of a specific obstacle to be stored in the obstacle memory means 5 and for outputting this position data, on the basis of the position data of the specific obstacles stored in the obstacle position storing means 5 or the obstacle position data converted by the absolute position computing means 4; obstacle detecting region computing means 10 for outputting, in terms of the coordinate values on the absolute coordinate system, the obstacle detecting region in which any object is detectable from the instant position and heading of the vehicle, on the basis of the instant position and heading of the vehicle as measured by the position and heading measuring means 1 and also on the basis of a predetermined coverage of the obstacle detecting means 3 and the position of mounting of the obstacle detecting means 3 on the vehicle; obstacle movement detecting means 11 for judging whether any one of the specific obstacles the position data of which have been stored in the obstacle position memory means 5 resides in the present obstacle detecting region which is output from the obstacle detecting region computing means 10, the obstacle movement detecting means 10 being further adapted for judging, upon judging that any one of the specific obstacles resides in the obstacle detecting region and in accordance with the new data which is output from the obstacle detecting means 3 and representing presence or absence of any obstacle and, when the obstacle exists, the position data concerning the obstacle converted into values on the absolute coordinate system by the absolute position computing means 4, whether one of the obstacles which is to be detected in the obstacle detecting region has moved out of the obstacle detecting region and, hence, not detected; and stored obstacle position erasing means 12 for erasing the position data of the obstacle stored in the obstacle position memory means 5 when the obstacle movement detecting means 11 has judged that the obstacle has been moved out of the obstacle detecting region; whereby the position data concerning positions of obstacles stored in the obstacle position memory means 5 is corrected in accordance with the movement of the obstacle.

The operation of the obstacle data processing system in accordance with the second mode will be described hereinunder. It is possible to construct the system in such a manner that the position data concerning the position of an obstacle is stored in the memory when the detected obstacle is a new one which has not been detected in the past, whereas, when the detected obstacle is identical to one of the obstacles which have been detected in the past and stored already in the memory, the operation for storing the coordinate value of this obstacle in the memory is checked. Such a construction, however, cannot enable the unmanned vehicle to cope with any change in the circumstance, i.e., a case where one or more of the obstacles which had been detected already have been moved from the positions the coordinate values of which are stored in the memory.

In order to obviate such inconvenience, the obstacle data processing system in accordance with the second mode of the present invention features, in addition to the constituents of the aforementioned aspect of the invention, the obstacle detecting region computing means 10, obstacle movement detecting means 11 and the stored obstacle position erasing means 12 which will be explained below.

The obstacle detecting region computing means 10 is adapted for outputting, in terms of the coordinate values on the absolute coordinate system, the obstacle detecting region in which any object is detectable from the instant position and heading of the vehicle. This computation is conducted on the basis of the instant position and heading of the vehicle as measured by the position and heading measuring means 1 and also on the basis of a predetermined coverage of the obstacle detecting means 3, as well as the position of mounting of the obstacle detecting means 3 on the vehicle.

The obstacle movement detecting means 11 is adapted for judging whether any one of the specific obstacles the position data of which have been stored in the obstacle position memory means 5 resides in the present obstacle detecting region which is output from the obstacle detecting region computing means 10. The obstacle movement detecting means 11 is further adapted for judging, when it has been judged that any one of the specific obstacles resides in the obstacle detecting region, whether the obstacles which is to be detected in the obstacle detecting region has moved out of the obstacle detecting region and, hence, not detected. This judgment is conducted in accordance with the new data output from the obstacle detecting means 3 and representing presence or absence of any obstacle and, when the obstacle exists, also in accordance with the position data concerning the obstacle converted into values on the absolute coordinate system by the absolute position computing means 4.

The stored obstacle position erasing means 12 is adapted for erasing the position data of the obstacle stored in the obstacle position memory means 5 when the obstacle movement detecting means 11 has judged that this obstacle has been moved out of the obstacle detecting region.

Thus, the position data concerning positions of obstacles stored in the obstacle position memory means 5 is corrected in accordance with the movement of the obstacles.

This system is not intended for positively controlling the moved obstacles, but is intended to enable the unmanned vehicle to cope with varying circumstance, i.e., moving obstacles. Thus, the obstacle data processing system of the second mode can form data concerning moving obstacles in relation to time.

It is, therefore, possible to eliminate any useless averting operation which may otherwise be conducted to avert any ghost obstacle, i.e., to avert a position in which no obstacle exists actually.

An obstacle data processing system in accordance with a third mode of the invention will be described hereinunder with reference to FIG. 6. As will be seen from this Figure, according to the third mode of the present invention, there is provided an obstacle data processing system for a self-controlled unmanned vehicle, having position and heading measuring means 1 for measuring the position and heading of the unmanned vehicle and for outputting position and heading data corresponding to the detected position and heading, running course memory means 2 for storing data concerning a running course which determines the movement of the unmanned vehicle, driving means 13 for driving and steering the unmanned vehicle, and running control means 14 for comparing the position and heading data with the data concerning the course stored in the running course memory means and for computing the controlled variable for controlling the driving means, thus enabling the unmanned vehicle to run along the course in a self-controlled manner. The system further includes: obstacle detecting means 16 for detecting the positions of obstacles; obstacle criticalness judging means 17 for computing, on the basis of the data concerning the course stored in the running course memory means 2 and the obstacle position data derived from the obstacle detecting system 16, the distance between an obstacle and the running course, the obstacle criticalness judging means being further adapted to judge whether it is necessary for the unmanned vehicle to conduct any averting operation, through comparison between the computed and distance and a threshold value; and averting operation determining means 15 for determining, when the obstacle criticalness judging means 17 has judged that an averting operation is necessary, an averting operation which will enable the unmanned vehicle to detour the point where the obstacle exists, in accordance with the obstacle position data derived from the obstacle detecting means 16 and the position and heading data obtained from the position and heading measuring means 1, while taking into account the distance between the obstacle and the position at which the vehicle is in the averting operation, the averting operation determining means being further adapted for renewing the data concerning the running course stored in the running course storage means 2 in accordance with the averting operation determined by the determining means, thereby enabling the unmanned vehicle to execute the averting operation.

Figure 6:
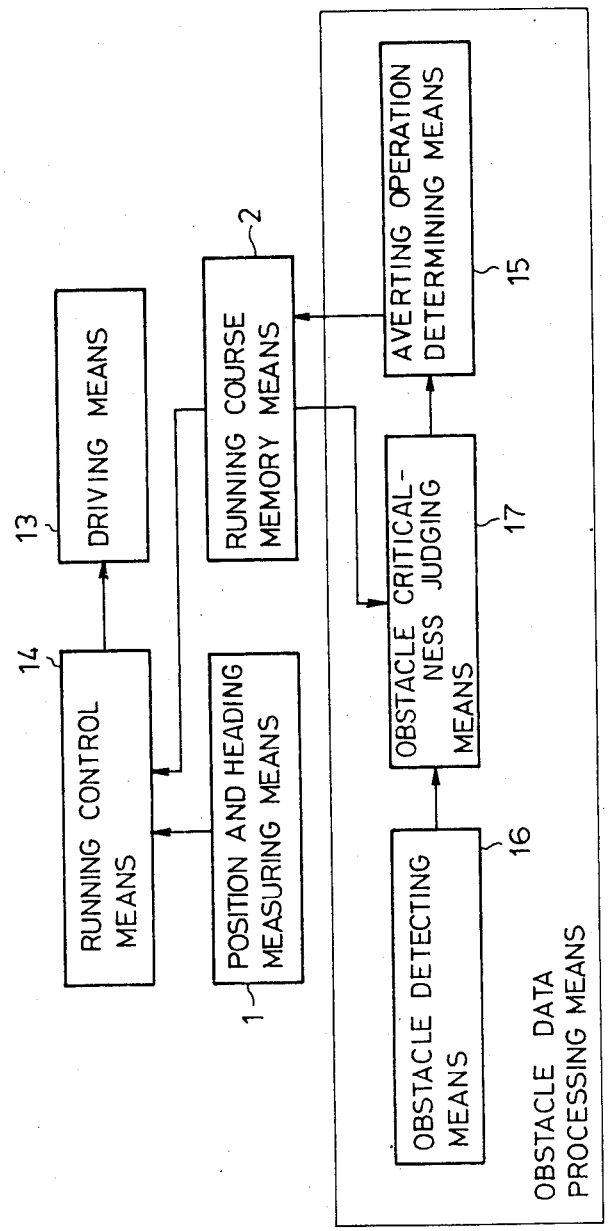
FIG. 6 is a schematic illustration of a third mode of the present invention.

Referring to FIG. 6, the obstacle detecting means 16 detects the obstacle and outputs its position which is i stored and accumulated. Even when the number of the obstacle position data obtained in one detecting cycle may be small, it is possible to obtain an abundant obstacle position data through repetition of the detecting cycles, thus making it possible to form a map or pattern of distribution of many obstacles. This in turn enables the unmanned vehicle to cope with a variety of distributions of the obstacles. On the other hand, when the obstacle detecting means 16 outputs the obstacle position each time it detects the obstacle and it doesn't store or accumulate the position, it may be possible to avert the obstacle based on the outputted obstacle position. When obstacle position data is derived from the obstacle detecting means 16, it is necessary to judge whether this obstacle is in the destined course of the vehicle and, hence, should be averted. This judgment is conducted by the obstacle criticalness judging means 17. The obstacle criticalness judging system 17 is adapted for judging the necessity for averting operation on the basis of the distance between the obstacle and the running course by making use of the running course data derived from the running course memory means 2. Without this judgment, the unmanned vehicle is obliged to conduct averting operation even for obstacles which have no possibility of collision by the unmanned vehicle, resulting in a serious reduction in the operation efficiency of the unmanned vehicle.

The averting operation determining means 15 is adapted for determining the operation to be performed by the unmanned vehicle for the purpose of averting an obstacle, when the obstacle, is judged by the obstacle criticalness judging means 17 as being necessary to collide with the unmanned vehicle. This judgment is conducted on the basis of the distance between the obstacle and the unmanned vehicle or the distance between the obstacle and the position at which the unmanned vehicle is in its averting operation. The determination of the averting operation may be conducted merely as a short-term command such as a speed instruction which rules the speed of the unmanned vehicle in the next moment or in the form of a long-term command such as alteration of the path of the unmanned vehicle. In response to the output from the averting operation determining means, the running control means 14 computes the required amount of control in accordance with which the driving means 13 is controlled so as to attain an actual averting motion in conformity with the averting operation determined by the averting operation determining means 15. Even after the commencement of the averting operation, the system can examine whether the determined averting operation is appropriate or whether there is any change in the state of the obstacle to be averted, by making use of the obstacle data derived from the obstacle detecting means 16. This judgment enables the unmanned vehicle to choose better averting operation and to cope with any change in the state of the obstacle. In addition, the system does not take into consideration any unnecessary data such as the configuration of the obstacle, but processes only those data which are necessary and enough for enabling the unmanned vehicle to avert the obstacle. In consequence, the process for determining the averting operation can be conducted at a practically acceptable processing speed, without being accompanied by any complication of the process and system construction.

In the obstacle data processing system in accordance with a fourth mode of the present invention, the comparison means is adapted to compare, with a predetermined threshold value, the distances between the coordinate values of specific obstacles stored in the obstacle position memory means and the coordinate value of position of an obstacle after conversion by the absolute position computing means, the comparison means being adapted to judge, when all the distances are greater than the threshold value, that the obstacle is a newly detected obstacle, whereas, when at least one of the distances is exceeded by the threshold value, the comparison means judges that the obstacle is identical to one of the specific obstacles which has been already detected and the position coordinate value of which has been already stored in the obstacle position storing means.

Thus, the fourth mode of the present invention proposes an example of the processing to be performed by the comparison means 6. Namely, in this mode, the comparison between the obstacle position coordinate values stored in the obstacle memory means 5 and the obstacle position coordinate value newly converted by the absolute position computing means 4 is conducted by evaluating the distances between the positions corresponding to the stored coordinate value and the position corresponding to the converted coordinate value, i.e., through comparison between the distances and a predetermined threshold. When the distance values obtained with all the obstacle positions stored in the obstacle position memory means 5 exceed the threshold, the comparison means that the obstacle now detected is far from all the obstacles registered in the obstacle position memory means and, therefore, is a new obstacle the position data of which has not entered yet. However, if a distance value computed with respect to a specific one of the obstacles registered in the obstacle position memory means is smaller than the threshold value, the comparison means judges that the obstacle now detected is identical to the specific one of the obstacles, i.e., that the same obstacle is detected again. According to the fourth mode, therefore, it is possible to judge whether the newly detected obstacle is identical to one of the obstacles which have already been detected and registered in the obstacle position memory means 5.

The present invention in its fifth mode proposes a modification of the fourth mode in which the storage obstacle position computing means is adapted to output the position coordinate value of the obstacle converted by the absolute position computing means as position data of a specific obstacle, when the comparison means has judged that the obstacle is a newly detected one, whereas, when the comparison means has judged that the obstacle is identical to one of the specific obstacles which has been already detected and the position coordinate value of which has been already stored in the obstacle position storing means, the storage obstacle position computing means does not output the position coordinate value of the obstacle converted by the absolute position computing means as position data of a specific obstacle.

Figure 7:
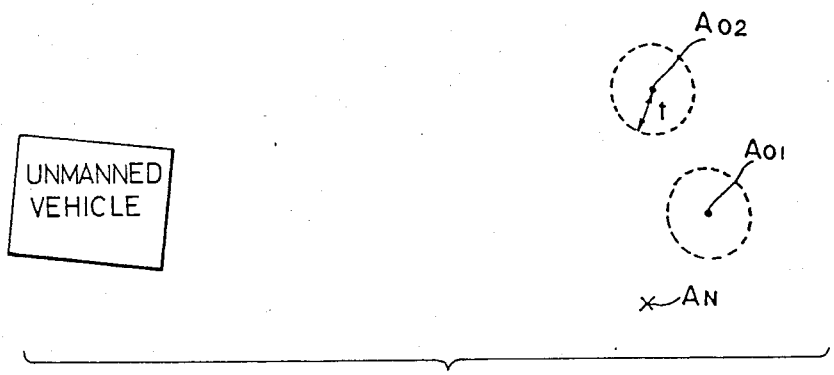
FIGS. 7 and 8 are plan views of fifth and sixth modes of the present invention.

Thus, the fifth mode of the invention is a practical way for accumulating the obstacle position data in the obstacle position data memory means 5 in accordance with the result of the judgment conducted by the comparison means 6 in the fourth mode. More specifically, when the comparison means 6 has judged that the newly detected obstacle is a novel one which is different from all the obstacles registered in the obstacle position memory means 5, the storage obstacle position computing means 7 adds the data of this newly detected obstacle to the content of the obstacle position memory means 5. For instance, referring to FIG. 7, when the coordinate value of a detected obstacle $A_N$ is outside the region of a radius t (corresponds to threshold value mentioned above) centered at the coordinate position of an obstacle $A_O$ registered in the obstacle position memory means 3, the storage obstacle position computing means 7 judges that the detected obstacle $A_N$ is a novel one which is different from the obstacle $A_O$ which has been detected and registered in the obstacle position memory means 5.

Figure 8:
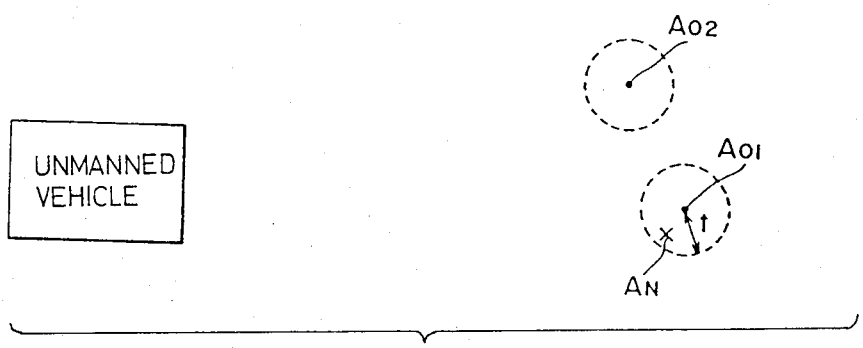

Conversely, when it is judged that the obstacle is identical to one of the specific obstacles which has been already detected and the position coordinate value of which has been already stored in the obstacle position storing means, the storage obstacle position computing means 7 does not allow the position coordinate value of the detected obstacle to be stored in the obstacle position memory means 5. Namely, as shown in FIG. 8, the position coordinate value of the detected obstacle $A_N$ is compared with the position coordinate values of obstacles $A_{01}$, $A_{02}$ which have been already detected and registered in the obstacle position memory means 5. When the position coordinate value of the obstacle $A_N$ falls within one of the regions of a radius t (corresponds to the threshold value mentioned above) centered at the obstacles $A_{01}$ and $A_{02}$, respectively, the judgment is done that the obstacle now detected is the same as one of the obstacles $A_{01}$ and $A_{02}$. FIG. 8 illustrates a case where the obstacle $A_{01}$ which has been already detected and registered is detected again as an obstacle $A_N$. With this arrangement, it is possible to form, in the obstacle position memory means, obstacle data in the form of a group of obstacles which are expressed in the form of isolated points spaced from one another by distances which are not smaller than the threshold value which is used as the basis for the judgment performed by the comparison means 6. According to this arrangement, since unnecessary data has been neglected, the capacity of the memory means is saved and the steps of the data processing is reduced because the quantity of the data stored in the memory means can be reduced.

In a sixth mode of the present invention, when the comparison means has judged that the obstacle is identical to one of the obstacles which have been already detected and the position coordinate values of which has been already stored in the obstacle position storing means 5, the storage obstacle position computing means 7 corrects the position coordinate value of the identical obstacles stored in the obstacle position memory means 5 in accordance with the position coordinate value of the newly detected obstacle, and outputs the corrected coordinate value as the position data concerning the detected obstacle.

Thus, in the sixth mode of the present invention, the newly obtained position data concerning the obstacle which is detected for the second time is utilized as correct and new position data concerning this obstacle, in contrast to the fifth mode in which, when it is judged that the detected obstacle is identical to one of the obstacles detected and registered already as shown in FIG. 8, the newly obtained position data concerning the detected obstacle is wasted without being entered.

Namely, in the sixth mode of the invention, when the comparison means has made a decision that the newly detected obstacle is the same as one of the obstacles which were detected before and registered, the storage obstacle position computing means 7 operates to correct the obstacle position data of this obstacle stored in the obstacle position memory means in conformity with the position coordinate value newly obtained with this obstacle, whereby the accuracy of the content stored in the obstacle position memory means is enhanced.

Preferred embodiments of the present invention will be described hereinunder with reference to the accompanying drawings.

The embodiment of the obstacle position processing system for unmanned vehicle in accordance with the present invention is applied to a self-controlled unmanned vehicle which is capable of running by itself without any aid of guide lines, more particularly to an apparatus for enabling such an unmanned vehicle to avert any obstacle which exists in the course of the vehicle.

Figure 9:
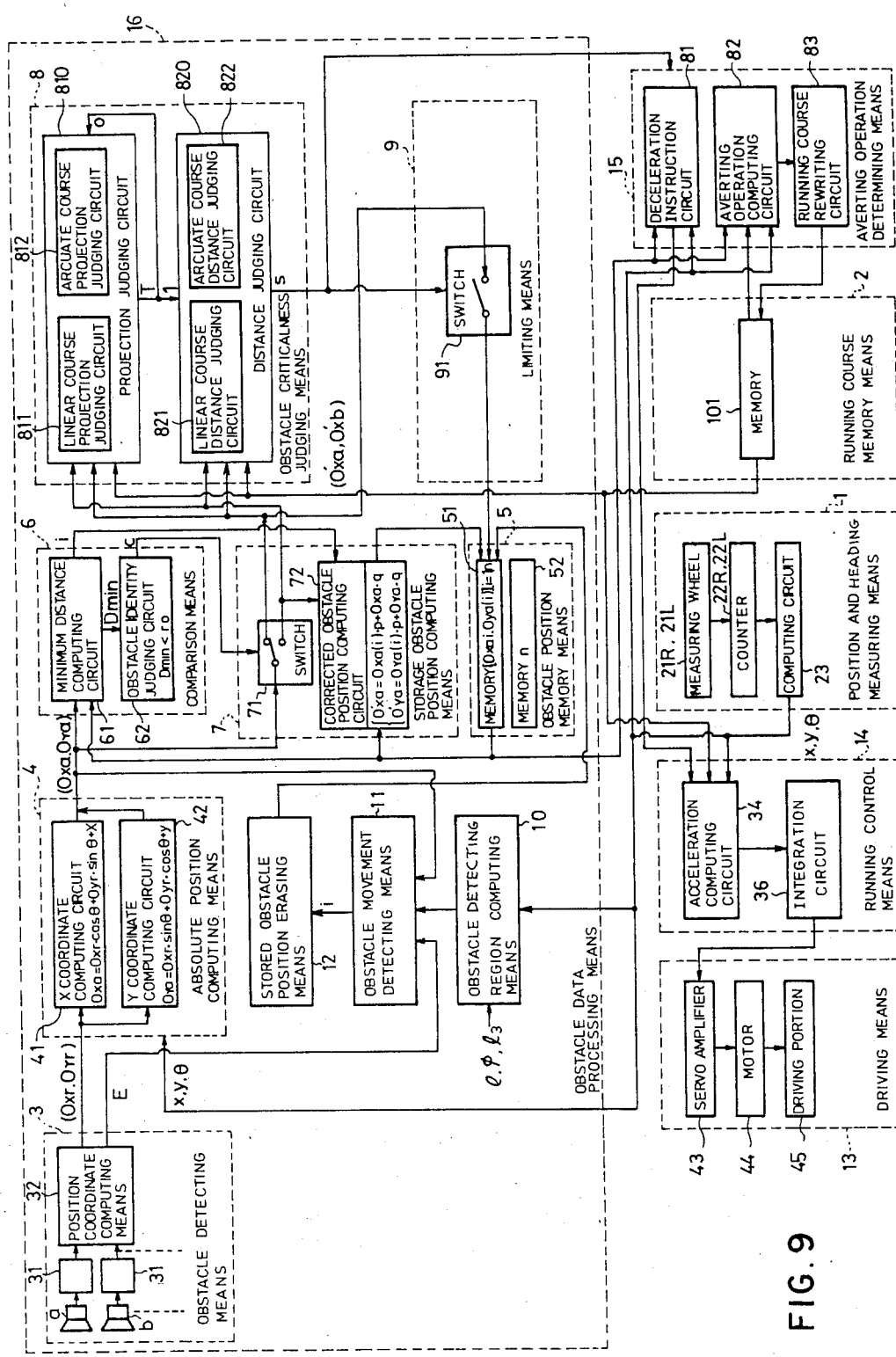
FIG. 9 is an illustration of the whole system of the present invention.

FIG. 9 is a block diagram of a collision averting system incorporating the obstacle data processing system in accordance with the present invention.

As will be seen from FIG. 9, the obstacle data processing system of this embodiment has the following constituents: a running course memory means 2 storing data concerning the command course and command speed of the vehicle; a position and heading measuring means 1 for measuring the instant position and heading of the unmanned vehicle; a running control means 14 for computing the control amount necessary for enabling the vehicle to run along the command course at the command speed, in accordance with the position and heading of the unmanned vehicle derived from the position and heading measuring means and the command course and the command speed stored in the running course memory means 2; driving means 13 for actually driving the unmanned vehicle in accordance with the control amount which is output from the running control means 14; an obstacle data processing means 16 adapted for detecting the position of an obstacle and for processing the data concerning the position of the obstacle so as to judge the necessity for the averting operation of the unmanned vehicle for the purpose of averting the object, the obstacle data processing means 16 being further adapted for forming and storing data concerning distribution of a plurality of obstacles; and averting operation determining means 15 which, when an obstacle to be averted is detected, provides a deceleration instruction to the running control means 14 and computes a detouring path which detours the obstacle and then stores the detouring path in said running course memory means 2 as a new command course along which the unmanned vehicle is bound to run.

The obstacle data processing means 16 includes the following components functions: namely, obstacle detecting means 3; absolute position computing means 4; obstacle position memory means 5; comparison means 6; storage obstacle position computing means 7; obstacle criticalness judging means 8; limiting means 9; obstacle detecting region computing means 10; obstacle movement detecting means 11; and the storage obstacle position erasing means 12.

To explain in more detail, the obstacle detecting means 3 is designed for detecting an obstacle and adapted for outputting position data concerning the position of the obstacle. The absolute position computing means 4 is adapted for converting, in accordance with the position and heading measured by the position and heading measuring means 1, the obstacle position data ($O_{xr}, O_{yr}$) derived from the obstacle detecting means 3 into absolute position data in terms of coordinate values on an absolute coordinate system which is on the ground where the vehicle runs. The obstacle position memory means 5 is for storing the position data concerning obstacles which have been detected in the past. The comparison means 6 is designed for comparing position of a newly detected obstacle output from the absolute position computing means 4 with the positions of the specific obstacles the position data of which have been stored in the obstacle memory means 5. The storage obstacle position computing means 7 is adapted to compute, in accordance with the result of comparison performed by the comparison means 6 and on the basis of the obstacle position stored in the obstacle position memory means 5 or the obstacle position data output from the absolute position computing means on the newly detected obstacle, the obstacle position data to be stored in the obstacle position memory means 5 such that the stored obstacle position data is updated and corrected as a result of repetition of the detecting operation. The obstacle criticalness judging means 8 is adapted for determining, when the position data concerning an obstacle to be stored in the obstacle position memory means 5 is output from the storage obstacle position computing means 7, the distance between the position data of the obstacle and the position data along the course stored in the course memory means 2 and for comparing the determined distance with a predetermined threshold value, the obstacle criticalness judging means 8 being adapted for deciding, when the distance is smaller than the threshold value, that the obstacle is in the course of the unmanned vehicle and hence should be averted. The limiting means 9 is intended for limiting the storage of the obstacle position data in the obstacle position memory means 5 when the obstacle criticalness judging means 8 has judged that there is no need for the vehicle to conduct any operation to avert the obstacle because of no possibility of collision between the obstacle and the unmanned vehicle.

The obstacle detecting region computing means 10 is adapted for outputting, in terms of the coordinate values on the absolute coordinate system, the obstacle detecting region in which any object is detectable from the instant position and heading of the vehicle, on the basis of the instant position and heading of the vehicle as measured by the position and heading measuring means 1 and also on the basis of a predetermined coverage of the obstacle detecting means 3 and the position of mounting of the sensors a, b . . . constituting the obstacle detecting means on the unmanned vehicle.

The obstacle movement detecting means 11 judges whether any one of the specific obstacles the position data of which have been stored in the obstacle position memory means 5 resides in the present obstacle detecting region which is output from the obstacle detecting region computing means 10. The obstacle movement detecting means further judges whether any one of the obstacles which is to be detected in the obstacle detecting region has moved out of the obstacle detecting region and, hence, not detected, upon confirming that any one of the obstacles resides in the obstacle detecting region output from the obstacle detecting region computing means 10. The judgment is conducted in accordance with the new data which is output from the obstacle detecting means 3 and representing presence or absence of any obstacle and, when the obstacle exists, also in accordance with the position data converted by the absolute position computing means 4.

The stored obstacle position erasing means 12 is adapted for erasing the position data of the obstacle stored in the obstacle position memory means 5 when the obstacle movement detecting means 11 has judged that the obstacle has been moved out of the obstacle detecting region.

The obstacle detecting means 3 includes a plurality of supersonic sensors a, b . . . mounted on the unmanned vehicle so as to be able to detect any obstacle which lies ahead of the vehicle and, hence, has a possibility of collision with the vehicle, a plurality of distance measuring means 31 connected to the respective sensors and adapted for measuring the distances between the sensors and the obstacle, and a position coordinate computing means 32 adapted for computing, in accordance with the output from the distance measuring means 31, the coordinate value of a point on the obstacle which is closest to the unmanned vehicle. Thus, the obstacle detecting means 3 outputs a logical signals E upon detection of the obstacle, as well as position coordinate ($O_{xr}, O_{yr}$) of the obstacle in terms of a coordinate system which is fixed to the unmanned vehicle. The logical signals E take a value "1" when the sensors have detected an obstacle and a value "0" when the sensor have not detected any obstacle.

The absolute position computing means 4 converts the position coordinate ($O_{xr}, O_{yr}$) of the obstacle derived from the obstacle detecting means 3 into position coordinate ($O_{xa} O_{ya}$) in terms of a common absolute coordinate system assumed on the area where the vehicle runs. This conversion is conducted in accordance with the position (x, y) and the heading $\theta$ of the unmanned vehicle derived from the position and heading measuring means 1. Thus, the absolute position computing means 4 is composed of an X coordinate computing circuit 41 for computing and outputting a coordinate value $O_{xa}$ and a Y coordinate computing circuit 42 for outputting a coordinate value $O_{ya}$. The X coordinate computing circuit 41 and the Y coordinate computing circuit 42 are adapted for conducting computation in accordance with the following formulae, respectively.

$$O_{xa} = O_{xr}\cos\theta - \sin\theta + x \qquad (1)$$

$$O_{ya} = O_{xr}\sin\theta - O_{yr}\cos\theta + y \qquad (12)$$

This computation can be performed by employing a triangular function generator, a multiplier and an adder.

The origin of the coordinate system which is fixed to the unmanned vehicle is designed to coincide with the position reference points (X, Y) in the absolute coordinate system, and also the direction of X-axis which is fixed to the unmanned vehicle is designed to coincide with the reference direction θ in the absolute coordinate system. Accordingly the coordinate converting computation is thus simplified as represented in the formulae (1) and (2).

The obstacle position memory means 5 includes a memory for storing a plurality (n) of obstacle position coordinates ($O_{xa}<i>$, $O_{ya}<i>$) (where, $i=1, 2, \ldots n$) and a memory 52 for storing the total number n of the obstacles.

The comparison means 6 includes a minimum distance computing circuit 61 which computes distance values between the position coordinates ($O_{xa}<i>$, $O_{ya}<i>$) stored in the obstacle position memory means 5 and the position coordinate ($O_{xa}$, $O_{ya}$) of a new obstacle obtained by converting the output of the obstacle detecting means 3 by the absolute position computing means 4, for all of the obstacles registered in the obstacle position memory means 5. The minimum distance computing circuit 61 then outputs the minimum value Dmin of the compute distances together with the No. i which identifies the obstacle corresponding to the minimum distance Dmin. The comparison means 6 also includes an obstacle identity judging circuit 62 which compares the minimum distance Dmin with a predetermined threshold value ro. If the minimum distance Dmin is smaller than the threshold value ro, the obstacle identity judging circuit 62 judges that the newly detected obstacle is identical to the i-th obstacle which has already been detected and registered in the obstacle position memory means 5, whereas, when the minimum distance Dmin is greater than the threshold value ro, the obstacle judging circuit 62 judges that the newly detected obstacle is a novel one different from those which have been detected and registered. The obstacle identity judging circuit outputs a logical signal C which takes a value "1" when the newly detected obstacle is identical to one of the obstacles which have been detected and registered and a value "0" when it has judged that the newly detected obstacle is a novel one different from those already detected and registered. The logical signal C is delivered as the output logical signal of the comparison means 6 to the storage obstacle position computing means 7.

The storage obstacle position computing means 7 has a switch 71 which operates in the following manner in response to the output logical signal C representing the result of the comparison performed by the comparison means C. When the logical signal value C is "0", i.e., when the detected obstacle is a novel one different from those which have been detected and registered, the switch 71 sends the position coordinate ($O_{xa}$, $O_{ya}$) of this obstacle to the obstacle position memory means 5 through the switch 91 of the limiting means 9, thus allowing the position coordinate ($O_{xa}$, $O_{ya}$)derived from the absolute position computing means 4 to be added to the content of the obstacle position memory means 5. Conversely, when the logical signal C is "1", i.e., when the detected obstacle is identical to one of the obstacles which have been detected and registered already, the switch delivers the obstacle position coordinate ($O_{xa}$, $O_{ya}$) to a later-mentioned corrected obstacle position computing circuit 72 which performs data processing for correcting the obstacle position stored in the obstacle position memory means 5, by processing the obstacle position data stored in the obstacle position memory means 5 and the newly obtained obstacle position data, i.e., the obstacle position coordinate ($O_a$, $O_{ya}$).

The corrected obstacle position computing circuit 72 is provided in the storage obstacle position computing means 7. The function of this circuit 72 is as follows. It is assumed here that the comparison means 6 has judged that the newly detected obstacle, the position coordinate of which is output from the obstacle detecting means 3 and converted by the absolute position computing means 4, is identical to the i-th obstacle which has been already detected and registered. In such a case, the corrected obstacle position computing circuit 72 computes the weight mean of the position coordinate stored in the obstacle position memory means 5 and the newly obtained position coordinate, so that the obstacle position coordinate stored in the obstacle position memory means 5 is up-dated and corrected as a result of repetition of the detecting operation. More specifically, the corrected obstacle position computing circuit 72 corrects the obstacle position coordinate ($O_{xa}<i>$, $O_{ya}<i>$) stored in the obstacle position memory means 5, in accordance with the No. i of the obstacle closest to the newly detected obstacle and the corresponding obstacle position coordinate ($O_{xa}<i>$, $O_{ya}<i>$) (the No. i and the position coordinate being derived from the obstacle position memory means 5) concerning the obstacle which has been judged by the minimum distance computing means 61 as being closest to the newly detected obstacle and also in accordance with the obstacle position coordinate ($O_{xa}$, $O_{ya}$) delivered by the switch 71, whereby a new correct obstacle position coordinate ($O_{xa}'<i>$, $O_{ya}'<i>$) is obtained. Thus, the corrected obstacle position computing means 72 substitutes the new correct obstacle position coordinate ($O_{xa}'<i>$, $O_{ya}'<i>$) for the old obstacle position coordinate ($O_{xa}<i>$, $O_{ya}<i>$) corresponding to the i-th obstacle stored in the Obstacle position memory means 5.

More specifically, the corrected obstacle position computing means conducts computation in accordance with the following formulae (3) and (4).

$$O_{xa}'<i> = O_{xa}<i> \cdot p + O_{xa} \cdot q \qquad (3)$$

$$O_{ya}'<i> = O_{ya}<i> \cdot p + O_{ya} \cdot q \qquad (4)$$

where, p and q represent predetermined weight values which are determined to meet the condition of $(p+q)=1$.

The computation in accordance with the above-mentioned formulae (3) and (4) corresponds to the sixth mode of the invention. Namely, in this case, the position coordinate ($O_{xa}<i>$, $O_{ya}<i>$) stored in the obstacle position memory means 5 and the position coordinate ($O_{xa}$, $O_{ya}$) of the newly detected obstacle derived from the obstacle detecting means 3 and converted through the absolute position computing means 4 are the identical data, and the stored data is substituted by the weight means of these two data thus attaining a higher accuracy of the position coordinate stored in the obstacle position memory means. The obstacle position coordinate ($O_{xa}'<i>$, $O_{ya}'<i>$) computed by the corrected obstacle computing circuit 72 is delivered to and stored in the obstacle position memory means 5. As this operation is repeated, the accuracy of the obstacle data stored in the memory means 5 is progressively improved.

When the comparison means 6 has judged that the new position coordinate ($O_{xa}$, $O_{ya}$) output from the absolute position computing means 4 is a novel one different from those which have been detected already, this position coordinate ($O_{xa}$, $O_{ya}$) is added to the content of the obstacle position memory means 5 by means of the stored obstacle position computing means 7. On the other hand, when the new position coordinate ($O_{xa}$, $O_{ya}$) is identical to one of the obstacle position coordinate stored in the obstacle position memory means 5, the stored obstacle position computing means 7 corrects the stored coordinate in accordance with the newly obtained position coordinate and substitutes the corrected position coordinate for the old position coordinate in the obstacle position memory means 5. In both cases, the obstacle criticalness judging means 8 operates to judge, upon receipt of the new position coordinate ($O_{xa}$, $O_{ya}$) or the corrected position coordinate, whether the obstacle corresponding to such coordinate is near the course of the unmanned vehicle so that there is a risk for the vehicle to collide with the obstacle, i.e., whether there is any significance in the entry of the new position coordinate ($O_{xa}$, $O_{ya}$) or the corrected position coordinate.

To this end, the obstacle criticalness judging means 8 includes a projection judging circuit 810 which receives the position of the obstacle to be judged and the course data concerning the future course of the vehicle and judges whether the obstacle position is included by a region of a predetermined length of the course which may be linear or arcuate. The obstacle criticalness judging means 8 also includes a distance judging circuit for computing the distance between the running course and the obstacle, for both cases where the course is linear or circular, and for judging whether the distance is smaller than a predetermined threshold distance Dth. The projection judging circuit 810 includes a linear course projection judging circuit 811 for computing the distance between the position of the obstacle and the linear running course, and an arcuate course projection judging circuit 812 for computing the distance between the obstacle position and an arcuate or circular running course. The linear course projection judging circuit 811 and the arcuate course projection judging circuit 812 is selectively used depending on whether the course is linear or arcuate. The linear course projection judging circuit 811 conducts a computation in accordance with the following formula (5), as well as a judgment in accordance with the following formula (6).

$$t = \frac{(X_e - X_s)(O_{xa} - X_s)}{\sqrt{(X_e - X_s)^2 + (Y_e - Y_s)^2}} + \tag{5}$$

$$\frac{(Y_e - Y_s)(O_{ya} - Y_s)}{\sqrt{(X_e - X_s)^2 + (Y_e - Y_s)^2}}$$

$$0 \leq t \leq \sqrt{(X_e - X_s)^2 + (Y_e - Y_s)^2} + Tthl \tag{6}$$

where, ($X_s$, $y_s$) and ($X_e$, $Y_e$) are coordinate values of the starting and terminal ends of the linear running course, while Tthl is a predetermined threshold value. A computed projection value which is used as the subject of the judgment is represented by t.

When the condition shown in the formula (6) is met, the obstacle exists in the region of this linear course. In such a case, the output logical signal T of the projection judging circuit 810 takes a value "1", whereas, when the condition is not met, the output logical signal T takes a value "0".

The arcuate course projection judging circuit 812 conducts a computation in accordance with the following formula (7), as well as a judgment in accordance with the following formula (8).

$$t = a\tan\frac{O_{xa} - X_c}{O_{ya} - Y_c} \tag{7}$$

where atan is an inverse function of tan (tangent).

$$A_s \leq t \leq A_e + Tthc \tag{8}$$

where, $$A_s = a\tan\frac{X_s - X_c}{Y_s - Y_c}$$

$$A_e = a\tan\frac{X_e - X_c}{Y_e - Y_c}$$

In these formulae ($X_s$, $y_s$) and ($X_e$, $Y_e$) represent the starting and terminating ends of the arcuate running course, while ($X_c$, $Y_c$) represents the coordinate of the center of the arc. Tthc represents a predetermined threshold value employed in the judgment, while t represents the computed projection value which is the subject of the judgment.

The fact that the condition of the formula (8) is met means that the obstacle resides in the region of this arc. In such a case, the output logical signal T from the projection judging circuit 810 takes a value "1". Conversely, when the condition of the formula (8) is not met, the output logical signal T takes a value "0".

The distance judging circuit 82 is started when the output logical signal T takes a value "1". However, when the value of the logical signal T is "0", the next section or length of the running course is read and the projection judging circuit 810 is started for judging this new section of the running course. When the logical signal T from the projection judging circuit 810 continuously takes the value "0" throughout repetitional judging operations to the last section of the running course, the operation of the projection judging circuit 810 is ceased. In this case, it is judged that the obstacle doesn't exist in the course of the unmanned vehicle, and the obstacle criticalness judging means 8 produces an output logical signal S1 of "0" level.

The distance judging circuit 820 is started when the level of the output logical signal T from the projection judging circuit 810 is "1", i.e., when the obstacle exists in the future running course. The distance judging circuit 820 is composed of a linear course distance judging circuit 821 and an arcuate course distance judging circuit 822 which are used, respectively, when the running course as the object of the judgment is linear and arcuate. Thus, the linear course distance judging circuit 821 and the arcuate course distance judging circuit 822 are selectively used depending on whether the input running course is linear or arcuate.

The linear course distance judging circuit 821 conducts a computation in accordance with the following formula (9), as well as a judgment in accordance with the following formula (10).

$$d = \left| \frac{(X_e - X_s)(O_{ya} - Y_s)}{\sqrt{(X_e - X_s)^2 + (Y_e - Y_s)^2}} - \right. \tag{9}$$

-continued $$\frac{(Y_e - Y_s)(O_{xa} - X_s)}{\sqrt{(X_e - X_s)^2 + (Y_e - Y_s)^2}}$$

$$d \leq Dthl \tag{10}$$

where, Dthl represents a predetermined threshold value, while d represents the computed distance value which is used as the object of the judgment.

The fact that the condition of the formula (10) is met means that an obstacle exists in the region near the linear course. In such a case, it is naturally judged that the unmanned vehicle has a large possibility of collision with the obstacle and, hence, the storage of the position of this obstacle is a matter of great significance. In this case, therefore, the obstacle criticalness judging means 8 produces an output logical signal of "1" level. Conversely, when the condition of the formula (10) is not met, the obstacle criticalness judging means 8 produces an output logical signal of "0" level.

The arcuate course distance judging means 822 conducts a computation in accordance with the following formula (11), as well as a judgment as shown by the formula (12).

$$d = \sqrt{(O_{xa} - X_c)^2 + (O_{ya} - Y_c)^2} - Ro \tag{11}$$

$$d \leq Dthc \tag{12}$$

where, Dthc represents a predetermined threshold for the judgment, while d represents a distance value which is computed and used as the object of the judgment.

The fact that the condition of the formula (12) is met suggests that an obstacle exists in the region near the arcuate course. In such a case, it is naturally judged that the unmanned vehicle has a large possibility of collision with the obstacle and, hence, the storage of the position of this obstacle is a matter of great significance. In this case, therefore, the obstacle criticalness judging means 8 produces an output logical signal of "1" level. Conversely, when the condition of the formula (12) is not met, the obstacle criticalness judging means 8 produces an output logical signal of "0" level.

The output logical signal S from the obstacle criticalness judging means 8 is delivered not only to the limiting means 9 but also to an averting operation determining means 15 which has a function for enabling the unmanned vehicle to take a necessary action for averting the obstacle. Namely, the averting operation determining means 15 is started when the output logical signal S from the obstacle criticalness judging means 8 is of "1" level, i.e., when there is a necessity for an averting operation.

The limiting means 9 includes a switch 91 which is adapted to be opened and closed in accordance with the value of the output logical signal S of the obstacle criticalness judging means 8. The "1" level of the logical signal S means that the obstacle has a large possibility of collision with the unmanned vehicle so that the storage of the position coordinate of this obstacle is a matter of great significance. In this case, therefore, the switch 91 is closed so as to enable the obstacle position coordinate output from the absolute position computing means 4 to be directly delivered to the obstacle position memory means 5. On the other hand, the "0" level of the logical signal S suggests that the possibility of collision between the obstacle and the unmanned vehicle is so small that the position coordinate of the obstacle is not worth storing. In this case, therefore, the switch 91 is opened so as to prevent the obstacle position coordinate from the absolute position computing means 4 from being delivered to the obstacle position memory means 5. The opening and closing action of the switch may be conducted for all the obstacle position coordinates which are delivered to the obstacle position memory means 5 but the limitation of the delivery of the position coordinate to the obstacle position memory means may be omitted when the obstacle position coordinate is delivered to the memory means 5 for the purpose of correction of the position coordinate which has already been stored in the memory means 5.

The operation described hereinbefore enables the unmanned vehicle to avert the obstacle by a new course which detours the obstacle. The detecting operation for this obstacle is repeatedly conducted to acquire a higher accuracy of the position data, though the possibility of collision with this obstacle is small insofar as the vehicle runs along the detouring course.

Figure 10:
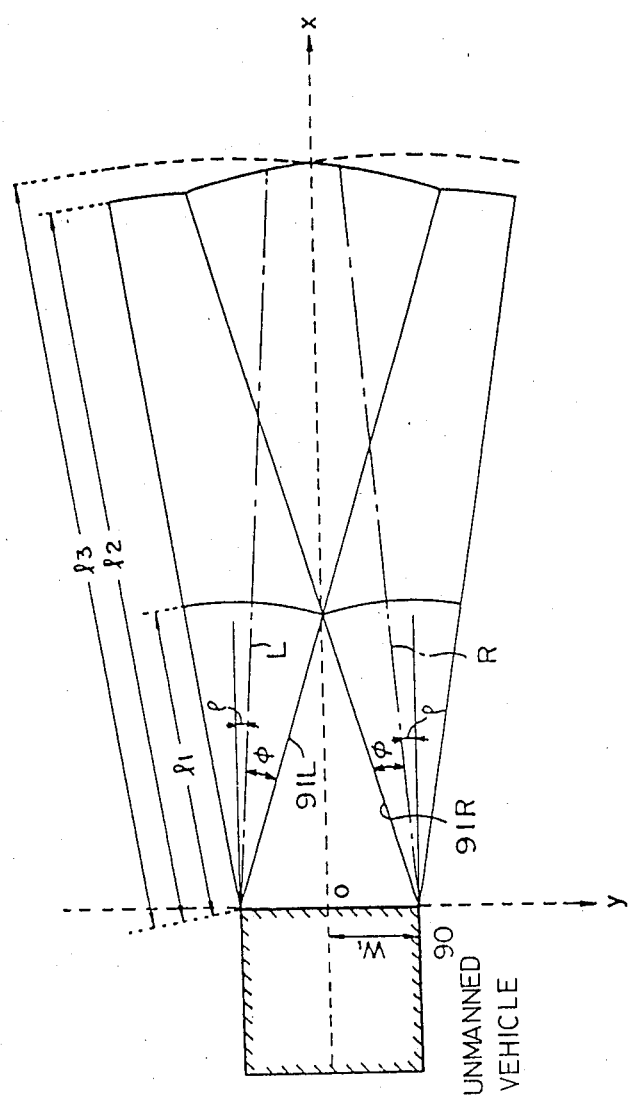
FIG. 10 is an illustration of an example of the position of installation of the sensor and the form of the regions over which the position measurement is possible.

The obstacle detecting region computing circuit 10 computes the region in which any obstacle is detectable from the instant position of the unmanned vehicle and outputs the computed region in terms of the coordinate values on the absolute coordinate system. The computation is conducted on the basis of the instant position (x, Y) and the instant heading $\theta$ of the unmanned vehicle as obtained from the position and heading measuring means 1, and mounting positions of the sensors a and b on the unmanned vehicle. FIG. 10 exemplarily shows the obstacle detecting region of the obstacle detecting means 3 and the sensor mounting positions. With this arrangement, and using the instant position (x, y) and heading $\theta$ of the unmanned vehicle as obtained from the position and heading measuring means 1, a judgment is conducted as to whether a point P ($X_p$, $Y_p$) exists in this area. The judging computation is conducted in accordance with the following formula (13) or (14), and the obstacle detecting region computing means 10 can determine the values of factors which are employed in this judging computation.

$$0 \leq d_{pa} \leq l_3 \text{ and}$$

$$\theta - \rho - \Phi \leq \theta_{pa} \leq \theta - \rho + \Phi \tag{13}$$

or $$0 \leq d_{pb} \leq l_3 \text{ and}$$

$$\theta - \rho - \Phi \leq \theta_{pb} \leq \theta - \rho + \Phi \tag{14}$$

where, $\rho$ represents the angle formed between the direction of running of the unmanned vehicle and the axis lines L and R assumed in the obstacle detecting regions or coverages of the sensors a and b, $\Phi$ represents the angle formed between the direction of running of the unmanned vehicle and the lines 91R and 91L representing the ends of the coverages of the sensors a and b. The symbol $l_3$ represents the distance between the sensors a,b and the limit of the measuring range. Other factors employed in these formulae are defined as follows:

$$d_{pa} = \sqrt{(X_p - Y_{aa})^2 + (Y_p - Y_{aa})^2}$$

-continued $$d_{pb} = \sqrt{(X_p - Y_{ba})^2 + (Y_p - Y_{ba})^2}$$

$$\theta_{pa} = a\tan \frac{Y_p - Y_{aa}}{X_p - X_{aa}}$$

$$\theta_{pb} = a\tan \frac{Y_p - Y_{ba}}{X_p - X_{ba}}$$

$$X_{aa} = X_{ar} \cdot \cos\theta - Y_{ar} \cdot \sin\theta + x$$

$$Y_{aa} = X_{ar} \cdot \sin\theta + Y_{ar} \cdot \cos\theta + y$$

$$X_{ba} = X_{br} \cdot \cos\theta - Y_{br} \cdot \sin\theta + x$$

$$Y_{ba} = X_{br} \cdot \sin\theta + Y_{br} \cdot \cos\theta + y$$

The meanings of these factors are as follows:
  ($X_{ar}$, $Y_{ar}$): position of the sensor a in terms of the coordinate value on the coordinate system fixed on the unmanned vehicle.
  ($X_{br}$, $Y_{br}$): position Of the sensor b in terms of the coordinate value on the coordinate system fixed on the unmanned vehicle.
  ($X_{aa}$, $Y_{aa}$): position of the sensor a in terms of the coordinate value on the common absolute coordinate system.
  ($X_{ba}$, $Y_{ba}$): position of the sensor b in terms of the coordinate value on the common absolute coordinate system.

The obstacle movement detecting means 11 conducts the computation in accordance with the above formulae (12) and (13) on the obstacle position coordinate ($O_{xa}<i>$, $O_{ya}<i>$) which has already been stored in the obstacle position memory means 5, on the basis of values of factors of the obstacle detecting region output from the obstacle detecting region computing means 10, thereby judging whether the obstacle represented by the above-mentioned position coordinate resides in the obstacle detecting region for the instant position of the unmanned vehicle. If it is judged that the obstacle resides in the obstacle detecting region, the obstacle movement judging means 11 receives a logical signal E from the obstacle detecting means 3 representing the presence or absence of the obstacle. If the logical E indicates that no obstacle is detected in this region, the obstacle movement judging means judged that the above-mentioned obstacle registered in the obstacle position memory means has already moved out of the obstacle detecting region, and outputs the No. i which identifies the obstacle which has moved.

Conversely, when the obstacle is actually detected in the obstacle detecting region after the judgment that the obstacle i resides in this region, the judging operation is conducted as follows. Namely, in this case, a judgment is conducted on the basis of the position coordinate of the obstacle output from the absolute position computing means 4, whether the obstacle i which has been judged as residing in the obstacle detecting region is positioned ahead of the actually detected obstacle having the coordinate value ($O_{xa}$, $O_{ya}$) so that the judged obstacle i could not detected due to, for example, movement of the obstacle i out of this region, though the judged obstacle i should have been detected. This judgment is conducted in accordance with the following formulae:

when the obstacle is detected by the sensor a:

$$d_{pa} - d_{oa} < r_o \qquad (15)$$

when the obstacle is detected by the sensor b:

$$d_{pb} - d_{ob} < r_o \qquad (16)$$

where, the factors employed in the formulae (15) and (16) are given as follows:

$$d_{oa} = \sqrt{(O_{xa} - X_{aa})^2 + (O_{ya} - Y_{aa})^2}$$

$$d_{ob} = \sqrt{(O_{xa} - X_{aa})^2 + (O_{ya} - Y_{aa})^2}$$

$$d_{pa} = \{(O_{xa}<i> - X_{aa})^2 + (O_{ya}<i> - Y_{aa})^2\}^{\frac{1}{2}}$$

$$d_{pb} = \{(O_{xa}<i> - X_{ba})^2 + (O_{ya}<i> - Y_{ba})^2\}^{\frac{1}{2}}$$

The obstacle movement judging means 1 outputs the No. i identifying the judged obstacle, when it has judged that this obstacle i has disappeared from this region due to, for example, the movement of the obstacle itself, through the computation explained above.

Then, the stored obstacle position erasing means 12 operates in response to the signal output from the obstacle movement detecting means 11, so as to erase the data concerning the No. i obstacle, together with the identifying No. i.

The running course memory means 2 includes a memory 101 which beforehand stores parameters necessary for enabling the unmanned vehicle to run along a predetermined course. The parameters include, for example, the kinds of the action necessary for the vehicle to run along the course, pattern or form of the command course, and command speed at which the vehicle is destined to run. The writing of the data in the memory 101 is conducted in advance of the actual running operation.

The position and heading measuring means 1 includes independent right and left measuring wheels 21L and 21R, independent counter circuits 22R, 22L for counting the number of revolutions of the respective measuring wheels in a unit time, and a computing circuit 23 adapted for computing the instant position (x, y) and the heading 0 of the unmanned vehicle from the values counted by the counter circuits 22R, 22L.

The running control means 14 includes an acceleration computing circuit 34 adapted for determining the acceleration values for left and right wheels necessary for enabling the vehicle to run along the command course at the command speed, in accordance with the position and heading data derived from the position and heading measuring means 1 and the parameter values stored in the running course memory means 2, as well as any deceleration instruction. The running control means 14 also includes an integrating circuit 36 for integrating the acceleration values thereby determining the actual driving amounts, i.e., the rotation speeds, of the respective driving wheels.

The driving means 13 includes a motor 44, a servo amplifier 43 for controlling the rotation of the rotor of the motor 44 in accordance with the driving amount instruction given by the running control means 14, and a driving unit 45 which includes a clutch, gears and driving wheels.

The averting operation determining means 15 includes a deceleration instruction circuit 81 which computes, when any obstacle which should be averted by the obstacle data processing means 16 is detected, the deceleration necessary for the vehicle to avert the obstacle and delivers a corresponding deceleration instruction to the running control means 14, an averting course computing means 82 which computes an averting course which detours the obstacle so as to avoid collision, using data such as the position of the obstacle stored in the obstacle position memory means 5, the course data stored in the running course memory means 12 and the instant vehicle position and heading derived from the position and heading measuring means 1, and a running course rewriting circuit 83 for temporarily storing the averting course in the course memory means 12 so as to enable the vehicle to run along the averting course.

The operation of the embodiment having the described construction will be explained hereinunder. As the first step, parameter values necessary for enabling the unmanned vehicle to run along a predetermined course is written in the memory 101 of the running course memory means 2 in advance of the actual running of the vehicle. During the running of the unmanned vehicle, the independent counter circuits 22R and 22L in the position and heading measuring means 1 count the number of revolutions of the right and left measuring wheels 21R, 21L per unit time, and the computing circuit 23 computes the instant position and heading of the vehicle by making use of the values counted by the counter circuits 22R, 22L.

Meanwhile, in the running control means 14, the acceleration computing circuit 34 computes the acceleration values for both driving wheels necessary for enabling the vehicle to run precisely at the command speed along the command course, in accordance with the instant vehicle position and heading data derived from the position and heading measuring means 1 and the course parameter values stored in the running course memory means 12. The integrating circuit 36 then integrates the acceleration values and outputs command rotation speeds for both driving wheels, i.e., the actual driving amounts of both driving wheels. Needless to say, the acceleration value is negative when a deceleration instruction is being supplied.

In the driving means 13, the servo amplifier 43 controls the rotation of the rotor of the motor 44 in accordance with the driving amount given by the running control means 14. The rotation is transmitted to the driving wheels through the clutch and gears constituting the driving unit 45, thereby driving the unmanned vehicle.

The operation of the obstacle data processing means 16 is as follows. The obstacle detecting means 3 has supersonic sensors which cover area ahead of the vehicle where any obstacle to be averted may exist, and the respective distance measuring means 31 for determining the distance between the obstacle and the sensors. Thus, the distance measuring means 31 measure and output the distances between the sensors and the obstacle, when any obstacle is sensed by the sensors. Upon receipt of the distance values, the position coordinate computing means 32 operates so as to compute and output the position coordinate of a point on the obstacle closest to the vehicle, in terms of coordinate value $(0_{xr}, O_{yr})$ on a coordinate system fixed to the unmanned vehicle. This computation is conducted taking into account various data such as the mounting positions of the sensors and values representing the pattern of the measurable region, as well as data as to the relationships between the distance values and the distance measuring means. The position coordinate data $(O_{xr}, O_{yr})$ is delivered to the absolute position computing means 4. The position coordinate computing means 32 also delivers a logical signal E which represents whether an obstacle is actually recognized by the distance measuring means 31.

Upon receipt of the position coordinate data $(O_{xr}, O_{yr})$ from the obstacle detecting means 3, the X coordinate computing circuit 41 and the Y coordinate computing circuit 42 of the absolute position computing means 4 conduct a computation for converting the position coordinate $(O_{xr}, O_{yr})$ into coordinate values $(O_{xa}, O_{ya})$ on the common absolute coordinate systems assumed on the ground where the vehicle runs. This converting operation is conducted in accordance with the position coordinate data $(O_{xr}, O_{yr})$ derived from the obstacle detecting means 3 and the instant vehicle position $(x, y)$ and heading $\theta$ which are input from the position and heading measuring means 1. The position coordinate computed by and output from the absolute position computing means 4 is delivered to the comparison means 6, storage obstacle position computing means 7 and the obstacle movement detecting means 11.

The comparison means 6 receives the obstacle position coordinate $(O_{xa}, O_{ya})$ delivered by the absolute position computing means 4, as well as position coordinates $(O_{xa}<i>, O_{ya}<i>)$ stored in the obstacle position memory means 5. The minimum distance computing circuit 61 in the comparison means computes the distances between the obstacle position coordinate $(O_{xa}, O_{ya})$ and the stored obstacle position coordinates $(0_{xa}<i>, O_{ya}<i>)$ of all the obstacles $(i=1, \ldots, n)$ registered in the obstacle position memory means. The minimum distance computing means then compares the computed distance values so as to determine the smallest one of these distance values as the minimum distance value Dmin, together with the No. 1 which identifies the obstacle corresponding to the minimum distance value Dmin. The minimum distance value Dmin is then delivered to the obstacle identity judging circuit 62 which compares this minimum distance value Dmin with a predetermined threshold value $r_0$. When the minimum distance value Dmin is smaller than the threshold value $r_0$, the obstacle identity judging circuit 62 judges that this obstacle is identical to the No. i obstacle which have been already detected and stored in the obstacle position memory means 5. Conversely, when the minimum distance value Dmin is greater than the threshold value $r_0$, the obstacle identity judging circuit 62 judges that the detected obstacle is a novel one different from those which have been detected and stored. The obstacle identity judging circuit 62 produces an output C which takes a level "1" when the detected obstacle is identical to the i-th obstacle and "0" when the detected obstacle is a novel one.

Thus, the "1" level of the logical signal C output from the comparison circuit 6 means that an obstacle already stored in the obstacle position memory means 5 is detected again. In this case, the obstacle data processing means 16 conducts the following operation.

As the first step, the switch 71 in the stored obstacle position computing means 7 is turned so as to pass the obstacle position coordinate $(O_{xa}, O_{ya})$ to the corrected obstacle position computing circuit 72 which in turn operates to correct the stored obstacle position coordinate in the obstacle position memory means 5 in accordance with the newly obtained obstacle position coordinate. This correction is actually carried out by determining the weight mean of the obstacle position coordinate ($O_{xa}$, $O_{ya}$) input through the switch 71 and the obstacle position coordinate ($O_{xa}<i>$, $O_{ya}<i>$) stored in the obstacle position memory means 5 so as to determine a mean coordinate value ($O_{xa'}<i>$, $O_{ya'}<i>$) and storing this mean coordinate value as more ac position data in place of the old data ($O_{xa}<i>$, $O_{ya}<i>$) in the obstacle position memory means 5. The corrected obstacle coordinate computed by the absolute position computing means 7 is delivered to the obstacle criticalness judging means 8 which is adapted to judge whether the obstacle position is close to the course so that the possibility of collision is high, i.e., whether there is any significance in storing this position coordinate in the obstacle position memory means 5. The result S1 of the judgment conducted by the obstacle criticalness judging means 8 is then delivered to the averting operation determining means 15 as a signal for starting the averting operation.

The "0" level of the logical signal C output from the comparison means 6 means that the detected obstacle is a novel one different from those which have already been detected and stored. In this case, the operation of the obstacle data processing means 16 is as follows.

In the storage obstacle position computing means 7, the switch 71 is operated so as to permit the obstacle position coordinate ($O_{xa}$, $O_{ya}$) to be delivered through the switch 91 to the obstacle position memory means 5 Without conversion. The obstacle position coordinate delivered to the obstacle position memory means 5 also is delivered to the obstacle criticalness judging means 8 which conducts judgment as to whether the obstacle position is close to the course so that there is a high possibility of collision with the unmanned vehicle, i.e., whether there is a necessity of averting operation and, hence, of storage of the position data concerning this obstacle. The logical signal S representing the result of the judgment conducted by the obstacle criticalness judging means 8 is delivered to the limiting means 9. The limiting means 9 is disposed in the signal line which transmits the obstacle position coordinate ($O_{xa}$, $O_{ya}$) to the obstacle position memory means 5. When the level of the logical signal S is "1", the obstacle is critical so that the switch 91 of the limiting means is closed to allow the position coordinate ($O_{xa}$, $O_{ya}$) to be transmitted to the obstacle position memory means 5. On the other hand, when the level of the logical signal S is "0", the switch 91 is opened so that the obstacle position coordinate is not transmitted to the obstacle position memory means 5. The logical signal S representing the result of the judgment conducted by the obstacle criticalness judging means 8 is sent also to the averting operation determining means 15, as a signal for starting the averting operation.

One of the two kinds of operation described above is conducted each time an obstacle is detected, and the obstacle position data obtained with the thus detected obstacle is stored in the obstacle position memory means 5, thus broadening the scope and increasing the accuracy of the data accumulated in the obstacle position memory means 5.

In addition to the operations explained above, the obstacle data processing system of the present invention can have the following functions, in order to cope with any change in the situation which may be caused by, for example, movement of the obstacle. Namely, in some cases, any one of obstacles which have been already detected and registered in the obstacle position memory means 5 may actually not exist in the detecting area, due to, for example, movement of the obstacle itself. In such a case, it is possible to sense the absence of the obstacle and to erase the position data concerning such an obstacle from the content of the obstacle position memory means 5. In order to sense the absence of the obstacle the position data of which has been stored in the obstacle position memory means 5, the obstacle detecting region computing means 10 computes and outputs the region in which any obstacle is detectable by the sensors on the vehicle at the instant position, and outputs this region in the form of coordinate values on the absolute coordinate system. This computation is conducted by making use of data such as the instant vehicle position and heading derived from the position and heading measuring means 1, detectable region or coverage of the obstacle detecting means 3 and the mounting positions of the sensors of the obstacle detecting means on the unmanned vehicle. Then, the obstacle movement detecting means 11 conducts a judgment as to whether the obstacle in question actually exists in the obstacle detecting region at the instant position of the unmanned vehicle computed by the obstacle detecting region computing means 10. When it is judged that the obstacle exists in the detecting region, the judgment is conducted by making use of the data concerning the presence or absence of the obstacle derived from the obstacle detecting means 3 and the obstacle position coordinate output from the absolute position computing means when the obstacle is detected. The erasure of the data concerning the obstacle which has moved and disappeared is conducted by the stored obstacle position erasing means 12 which operates to erase the data concerning the i-th obstacle when the No. i has been delivered by the obstacle movement detecting means 11 as the No. which identifies the obstacle which has moved and disappeared.

When the obstacle data processing means 16 has judged that there is an obstacle which has to be averted, the deceleration instruction circuit 81 of the averting operation determining means 15 computes the necessary deceleration and delivers the same to the running control means 14 which in turn operates to decelerate the unmanned vehicle in accordance with the deceleration instruction. Meanwhile, the averting course computing circuit 82 computes an averting path or course, i.e., a course which detours the obstacle, on the basis of the data such as the position coordinate of the obstacle stored in the obstacle position memory means 5, data concerning the running course stored in the running course memory means, and the instant vehicle position and heading derived from the position and heading measuring means 1. Then, the running course rewriting circuit 83 operates to enable the computed averting path to be temporarily stored in the running course memory means 2, as the course along which the vehicle is to run to avert the obstacle. As the averting course is stored temporarily in the running course memory means 2, the unmanned vehicle which has been decelerated in accordance with the deceleration instruction runs along the averting course, as the running control is conducted to enable the vehicle to follow the averting course as in the case of the ordinary running course. When the vehicle has run out the averting course, the vehicle returns to the original running course, thus completing the averting operation.

As will be understood from the foregoing description, the present invention offers the following advantages. Firstly, it is to be pointed out that the provision of the obstacle position memory means enables the obstacle position data acquired in the past to be accumulated so as to form abundant obstacle position data for a wider area and with higher accuracy as compared with the case where the obstacle position memory means 5 is not provided, i.e., the case where the result of the obstacle detection is extinguished each time the operation is ceased. The abundant obstacle position data for wider area and with higher accuracy can be formed even if the obstacle detection means is such a simple one as can provide only a small quantity of data in each detecting operation as in the case of the obstacle detecting means employed in the described embodiment, provided that the detecting operation is repeated and the data acquired in successive detecting operation are stored in the obstacle position memory means. Using such abundant obstacle position data, it is possible to form a pattern of distribution of many obstacles. Such a distribution data will enable the unmanned vehicle to adapt to the situation with a higher degree of flexibility and efficiency than the case where the averting operation is conducted in response to a single obstacle position data obtained through each detecting operation. The absolute position computing means 4 makes the most of the feature of the unmanned self-controlled vehicle, i.e., the function for measuring the position and heading of the vehicle, and enables the above-described data processing to be performed with the assist of the memory means. Namely, the absolute position computing means 4 enables obstacle data acquired at different positions and at different times to be expressed by a single common coordinate system, thus facilitating the utilization of the obstacle position data, as well as comparison between different position data.

The comparison means 6 and the storage obstacle position computing means 7 in combination operate such that the newly acquired obstacle position data is not directly stored in the memory means but is stored after being processed in such a manner as to efficiently form an obstacle distribution data, through comparison with the obstacle position data which already have been stored in the obstacle position memory means. With such an arrangement, it is possible to obtain obstacle position data which is optimized for use, i.e., obstacle position data containing data about the obstacles in concern. Furthermore, the capacity of the memory can be reduced as compared with the case where all the acquired obstacle position data are directly stored.

The obstacle criticalness judging means 8 enables the vehicle to omit any operation for averting an obstacle which need not be averted. Storage of position data concerning such an obstacle which need not be averted is prevented by the limiting means 9, thus saving the storage capacity of the memory and preventing any meaningless increment of the quantity of data. The result of the judgment performed by the obstacle criticalness judging means 8 also is utilized as the signal for triggering the averting operation of the unmanned vehicle. This offers the following advantage, as compared with the case where the averting operation is triggered by the detection of an obstacle in a predetermined region ahead of the vehicle. Namely, if the running course is so determined as to cause the unmanned vehicle to turn to the right, any obstacle which lies ahead of the instant position of the vehicle does not matter. In such a case, if the averting operation is triggered solely by the detection of the obstacle ahead of the vehicle, the vehicle is obliged to conduct an unnecessary averting operation. In contrast, in the system of the present invention, such unnecessary averting operation is eliminated because the criticalness of the obstacle is judged always in relation to the command running course of the vehicle and, hence, the obstacle ahead of the vehicle can be judged as being not critical.

The provision of the obstacle detecting region computing means 10, obstacle movement detecting means 11 and the stored obstacle position erasing means 12 makes it possible to up-date and correct the obstacle position data stored in the obstacle position memory means 5, in response to any movement of an obstacle or obstacles. Namely, the obstacle position data can be momentarily renewed in relation to time to grasp the states of obstacles even when the obstacles are movable.

As sill be understood from the foregoing description, the obstacle data processing system in accordance with the invention can store and form wide, abundant and accurate obstacle position data because the obstacle position data acquired in successive detecting operation are accumulated in the memory means. The thus obtained obstacle position data is suitable processed to determine an averting path detouring any critical obstacle, thereby to avoid any collision between the unmanned vehicle and the obstacle.

In the described embodiment, the system employs various means such as the absolute position computing means 4, obstacle position memory means 5, comparison means 6, storage obstacle position computing means 7, obstacle criticalness judging means 8, limiting means 9, obstacle detecting region computing means 10, obstacle movement detecting means 11 and the stored obstacle position erasing means 12. These means are constructed as independent unit or hardwares. This, however, is not exclusive and the arrangement may be such that the functions of these means are performed in accordance with a program which is beforehand set in a microcomputer. Rather, the use of the microcomputer is preferred from a view point of easiness change in the operation program.

Although the invention has been described through specific terms, it is to be noted here that the described embodiment is only illustrative and various changes and modifications may be imparted thereto without departing from the scope of the invention which is limited solely by the appended claims.

What is claimed is:

1. An obstacle data processing system for self-controlled unmanned vehicle having a position and heading measuring means for measuring the position and heading of said unmanned vehicle and a running course memory means for storing position data of the position of said vehicle along a course so as to enable said vehicle to run along said course, said system comprising:

obstacle detecting means for detecting an obstacle and for outputting position data of the position of said obstacle in terms of coordinate values on a coordinate system fixed to said vehicle;

absolute position computing means for converting, in accordance with the position and heading measured by said position and heading measuring means at the time when said obstacle is detected, said position data derived from said obstacle detecting means into absolute position data in terms of coordinate values on an absolute coordinate system which is set to the ground where said vehicle runs and which constitutes a reference for the control of running of said vehicle;

obstacle position memory means for storing the position data of specific obstacles which have been detected, whose coordinate values are converted into the absolute coordinate values, said absolute coordinate values being stored and outputted;

comparison means for comparing position of an obstacle which has been converted by said position computing means with the positions of said specific obstacles the position data which have been stored in said obstacle memory means; and storage obstacle position position computing means for judging, in accordance with the result of the comparison performed by said comparison means, the position data of a specific obstacle to be stored in said obstacle position memory means and for outputting this position data, on the basis of the position data of the specific obstacles stored in said obstacle position memory means or the obstacle position data converted by said absolute position computing means.

2. An obstacle data processing system for a self-controlled unmanned vehicle according to claim 1, wherein said comparison means compares with a predetermined threshold value, the distances between the coordinate values of specific obstacles stored in said obstacle position memory means and the coordinate value of position of an obstacle after conversion by said absolute position computing means, said comparison means judging, when all said distances are greater than said threshold value, that said obstacle is a newly detected obstacle, whereas, when at least one of said distances is exceeded by said threshold value, said comparison means judges that said obstacle is identical to one of said specific obstacles which has been already detected and the position coordinate value of which has been already stored in said obstacle position memory means.

3. An obstacle data processing system for a self-controlled unmanned vehicle according to claim 2, wherein said storage obstacle position computing means outputs the position coordinate value of said obstacle converted by said absolute position computing means as position data of a specific obstacle, when said comparison means has judged that said obstacle is a newly detected one, whereas, when said comparison means has judged that said obstacle is identical to one of said specific obstacles which has been already detected and the position coordinate value of which has been already stored in said obstacle position memory means, said storage obstacle position computing means does not output the position coordinate value of said obstacle converted by said absolute position computing means as position data of a specific obstacle.

4. An obstacle data processing system for a self-controlled unmanned vehicle according to claim 2, wherein, when said comparison means has judged that said obstacle is identical to one of said specific obstacles which have been already detected and the position coordinate values of which has been already stored in said obstacle position memory means, said storage obstacle position computing means corrects the position coordinate value of said one of said specific obstacles in accordance with the position coordinate value of the newly detected obstacle, and outputs the corrected coordinate value as the position data of a specific obstacle 5. An obstacle data processing system for a self-controlled unmanned vehicle according to claim 1, further comprising:

obstacle criticalness judging means for determining, when the position data of the specific obstacle to be stored is output from said storage obstacle position computing means, the distance between said position data of said specific obstacle and the position data along said course stored in said running course memory means and for comparing the determined distance with a predetermined threshold value which is used as the basis for judgement of the closeness of said obstacle to said course, said obstacle criticalness judging means being adapted for deciding, when said distance is smaller than said threshold value, that said obstacle should be averted, whereas, when said distance is greater than said threshold value, said obstacle criticalness judging means judges that there is no need for said vehicle to conduct any averting operation; and limiting means for limiting the storage of the obstacle position data in said obstacle position memory means when said obstacle criticalness judging means has judged that there is no need for said vehicle to conduct any operation to avert said obstacle.

6. An obstacle data processing system for a self-controlled unmanned vehicle according to claim 1, further comprising:

obstacle detecting region computing means for outputting, in terms of the coordinate values on said absolute coordinate system, an obstacle detecting region in which any object is detectable from the instant position and heading of said vehicle, on the basis of the instant position and heading of said vehicle as measured by said position and heading measuring means and also on the basis of a predetermined coverage of said obstacle detecting means and the position of mounting of said obstacle detecting means on said vehicle;

obstacle movement detecting means for judging whether any one of the specific obstacles the position data of which have been stored in said obstacle position memory means resides in the present obstacle detecting region which is output from the obstacle detecting region computing means, said obstacle movement detecting means being further adapted for judging, upon judging that any one of said specific obstacles resides in said obstacle detecting region and in accordance with the new data which is output from said obstacle movement detecting means and representing the presence or absence of any obstacle and, when said obstacle exists, the position data of said obstacle is converted into values on said absolute coordinate system by said absolute position computing means, whether said any one of the specific obstacles which is to be detected in said obstacle detecting region has moved out of said obstacle detecting region and, hence, not detected; and stored obstacle position erasing means for erasing the position data of said obstacle stored in said obstacle position memory means when said obstacle movement detecting means has judged that said obstacle has been moved out of said obstacle detecting region;

whereby the position data of positions of obstacles stored in said obstacle position memory means is corrected in accordance with the movement of said obstacle.

7. An obstacle data processing system for a self-controlled unmanned vehicle having a position and heading measuring means for measuring the position and heading of said unmanned vehicle and a running course memory means for storing position data of the position of said vehicle along a course so as to enable said vehicle to run along said course, said system comprising:

obstacle detecting means for detecting an obstacle and for outputting position data of the position of said obstacle in terms of coordinate values on a coordinate system fixed to said vehicle;

absolute position computing means for converting, in accordance with the position and heading measured by said position and heading measuring means at the time when said obstacle is detected, said position data derived from said obstacle detecting means into absolute position data in terms of coordinate values on an absolute coordinate system based on the position of said vehicle and which constitutes a reference for the control of running of said vehicle;

obstacle position memory means for storing the position data of specific obstacles which have been detected and converted into said absolute coordinate system.

8. An obstacle data processing system for a self-controlled unmanned vehicle, having position and heading measuring means for measuring the position and heading of said unmanned vehicle and for outputting position and heading data corresponding to the detected position and heading, running course memory means for storing data concerning a running course which determines the movement of said unmanned vehicle, driving means for driving and steering said unmanned vehicle, and running control means for comparing said position and heading data with said data of said course stored in said running course memory means and for computing the controlled variable for controlling said driving means, thus enabling said unmanned vehicle to run along said course in a self-controlled manner, said system comprising:

obstacle detecting system for detecting the positions of obstacles and for outputting the obstacle position data including obstacle detecting means for detecting an obstacle and for outputting position data of the position of said obstacle in terms of coordinate values on a coordinate system fixed to said vehicle;

absolute position computing means for converting, in accordance with the position and heading measured by said position and heading measuring means at the time when said obstacle is detected, said position data derived from said obstacle detecting means into absolute position data in terms of coordinate values on an absolute coordinate system based on the position of said vehicle and which constitutes a reference for the control of running of said vehicle;

obstacle position memory means for storing the position data of specific obstacles which have been detected and converted into said absolute coordinate system;

obstacle criticalness judging means for computing, on the basis of the data of said course stored in said running course memory means and the obstacle position data derived from said obstacle detecting means, the distance between an obstacle and said running course, said obstacle criticalness judging means being further adapted to judge whether it is necessary for said unmanned vehicle to conduct any averting operation, through comparison between the computed distance and a threshold value; and averting operation determining means for determining, when said obstacle criticalness judging means has judged that an averting operation is necessary, an averting operation which will enable said unmanned vehicle to detour the point where said obstacle exists, in accordance with said obstacle position data derived from said obstacle detecting means and said position and heading data obtained from said position and heading measuring means, while taking into account the distance between said obstacle and the position at which said vehicle will commence said averting operation, said averting operation determining means being further adapted for renewing the data of said running course stored in said running course memory means in accordance with said averting operation determined by said averting operation determining means, thereby enabling said unmanned vehicle to execute said averting operation.

* * * * *